United States Patent Office 3,057,867
Patented Oct. 9, 1962

3,057,867
GLUTARIMIDE DERIVATIVES
William Taub, Rehovoth, Israel, assignor to Calanda-Stiftung, Institut für wissenschaftliche und technische Forschung, Vaduz, Liechtenstein
No Drawing. Filed June 9, 1961, Ser. No. 115,898
Claims priority, application Switzerland June 11, 1960
4 Claims. (Cl. 260—281)

The present invention concerns new glutarimide derivatives which have valuable pharmacological properties.

N-amino-glutarimides have not been known up to now. It has now been found that such compounds are obtained of the general Formula I

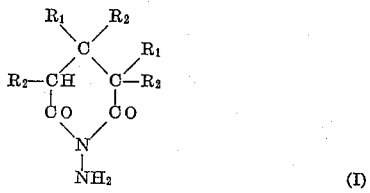

wherein one of the symbols $R_1$ is a member selected from the group consisting of phenyl, chlorophenyl, dichlorophenyl, dimethylphenyl, methoxyphenyl and benzyl, and the other $R_1$ is hydrogen, $R_2$ is a member selected from the group consisting of hydrogen, lower alkyl and lower alkenyl, with the proviso that at least one but at most two radicals $R_2$ are hydrogen and the heterocycle contains one quaternary carbon atom, if a monohydrazide or a reactive functional derivative of a monohydrazide (with regard to the remaining carboxyl group), of a substituted glutaric acid of the general Formula II

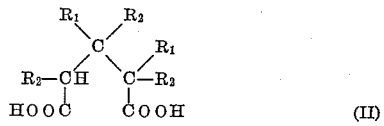

wherein $R_1$ and $R_2$ have the meanings given above, is subjected, in the presence or absence of solvents, to ring closing conditions, in particular a raised temperature.

More specifically, the new compounds correspond to the formulae

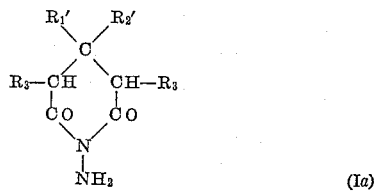

and

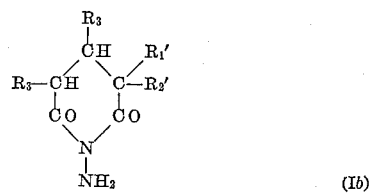

wherein
$R_1'$ is a member selected from the group consisting of phenyl, chlorophenyl, dichlorophenyl, dimethylphenyl, methoxyphenyl and benzyl,
$R_2'$ is a member selected from the group consisting of lower alkyl and lower alkenyl and
one $R_3$ is a member selected from the group consisting of hydrogen and lower alkyl and
the other $R_3$ is hydrogen.

An advantageous modification of the process described above consists for example, in using, as reactive derivative with regard to the remaining carboxyl group, the hydrazide, thus a dihydrazide of the general Formula III

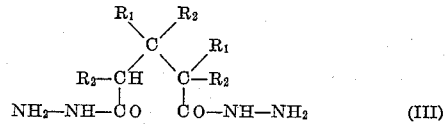

wherein $R_1$ and $R_2$ have the meanings given above, and heating this until one equivalent of hydrazine is split off. Dihydrazides of the general Formula III are most simply obtained in their turn by heating solutions of the free acid in aqueous hydrazine solution. In this reaction, first the excess water is given off and finally the remaining hydrazine salt of the acid is converted into the dihydrazide while splitting off two equivalents of water. Advtangeously the dihydrazide is further heated direct in vacuo until one equivalent of hydrazine is split off and the end product of the general Formula I is formed. If desired, this end product is continuously distilled off. Thus, starting from the free substituted glutaric acid and easily accessible aqueous hydrazine solution, the desired end product is obtained in a one-step process. However, the dihydrazides of the general Formula III can also be produced, for example, from the corresponding diesters.

As other, reactive derivatives of monohydrazides of substituted glutaric acids of the general Formula II, their esters for example, i.e. the monohydrazide monoesters of these acids, can be used. They are heated in the presence or absence of suitable inert organic solvents until the esterified hydroxyl compound is completely split off.

In the compounds of the general Formula I and in the corresponding starting materials, $R_1$ can be, for example, the phenyl, m-fluorophenyl, p-fluorophenyl, m-chlorophenyl, p-chlorophenyl, p-bromophenyl, m-trifluoromethylphenyl, o-methoxyphenyl, p-methoxyphenyl, p-ethoxyphenyl, p-n-propoxyphenyl, p-n-butoxyphenyl, 3,4-dimethoxyphenyl, p-methylphenyl, p-ethylphenyl, p-isopropylphenyl, benzyl, p-chlorobenzyl, p-methylbenzyl, p-ethoxybenzyl, 3,4-dimethoxybenzyl or β-phenylethyl radical, and $R_2$ can be, for example, the methyl, ethyl, n-propyl, isopropyl, n-butyl, isobutyl, allyl, crotyl or β-methallyl radical.

As has been further found, the compounds of the general Formula I have valuable pharmacological properties, of which one, among others, is strong anticonvulsive, sedative and sleep-inducing activity. They can be used therefore, e.g. as sedatives and soporifics when administered perorally in the form of tablets, coated tablets or capsules.

The substituted glutaric acids of the general Formula II are obtained, for example, by adding nitriles of the general Formula IV

$$R_1—CH_2—CN \qquad (IV)$$

to acrylic acid ester or acrylic acid nitrile, condensing the monosubstituted glutaric acid derivatives obtained with reactive esters, in particular halides, of low alkanols, alkenols and hydrolysing.

The following examples further illustrate the production of the new compounds according to the invention without limiting it in any way. Parts are given therein as parts by weight and their relationship to parts by volume is as that of grammes to cubic centimetres. The temperatures are in degrees centigrade.

Example 1

23.6 parts of α-phenyl-α-ethyl-glutaric acid are dissolved in 100 parts by volume of an aqueous hydrazine solution which contains 6.4 parts (2 mol-equivalents) of hydrazine. After removal of the excess water under reduced pressure, the hydrazinium salt of α-phenyl-α-ethyl-glutaric acid is heated in an oil bath at 180–200° under about 20 mm.

Hg pressure until the splitting off of water is complete. The crude dihydrazide of α-phenyl-α-ethyl-glutaric acid so formed is then distilled under a high vacuum whereupon the cyclic monohydrazide is formed while hydrazine is split off. The monohydrazide passes over at 180–190° under 0.8 mm. pressure. On rubbing with a little isopropyl alcohol, the viscous yellowish-coloured oil solidifies. After dissolving and recrystallising once from isopropyl alcohol the 1-amino-3-phenyl-3-ethyl-piperidine-2,6-dione is obtained in the form of colourless crystals which melt at 72–73°.

*Example 2*

44.4 parts of α-phenyl-α-methyl-glutaric acid are dissolved while slightly heating in 250 parts by volume of an aqueous hydrazine solution which contains 12.6 parts of hydrazine. After distilling off the excess water under reduced pressure, the hydrazinium salt of α-phenyl-α-methyl-glutaric acid is heated in an oil bath at about 200° under 20 mm. Hg pressure until the splitting off of water is complete. On distilling the dihydrazide of the α-phenyl-α-methyl-glutaric acid so formed under a high vacuum, it is converted into the cyclic hydrazide which passes over at 180–185° under 0.6 mm. pressure. On again distilling this fraction, 1-amino-3-phenyl-3-methyl-piperidine-2,6-dione is obtained as a colourless viscous oil which boils at 185–190° under 1 mm. Hg pressure.

The following compounds are obtained in an analogous manner:

1-amino-3-phenyl - 3 - n - butyl-piperidine - 2,6 - dione, B.P.$_{0.8}$195–205°,
1-amino-3-p-chlorophenyl-3-ethyl-piperidine-2,6-dione,
1-amino-3-p-methoxyphenyl-3-ethyl-piperidine-2,6-dione,
1-amino-3-phenyl-3-allyl-piperidine-2,6-dione, B.P.$_{1.3}$180–182°,
1-amino-3-ethyl-3-phenyl-4-methyl-piperidine-2,6-dione,
1-amino-3-ethyl-3-phenyl-5-methyl-piperidine-2,6-dione,
1-amino-4-phenyl-4-ethyl-piperidine-2,6-dione, M.P. 110–112°,
1-amino-3-(3′,4′-dimethylphenyl)-3-ethyl-piperidine - 2,6-dione, B.P.$_{1.5}$198–200°,
1-amino-3-(3′,4′-dichlorophenyl)-3-ethyl-piperidine - 2,6-dione,
1-amino-3-phenyl-3 - n - propyl - piperidine - 2,6 - dione, B.P.$_{2.5}$195–198°,
1-amino-4-phenyl-4-methyl-piperidine-2,6-dione, M.P. 75–76°,
1-amino-3-benzyl-3-methyl-piperidine-2,6-dione,
1-amino-4-p-methoxyphenyl-4-ethyl-piperidine-2,6-dione.

What I claim is:
1. A glutarimide derivative of the formula

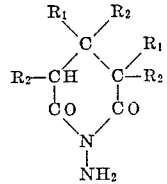

wherein one of the symbols $R_1$ is a member selected from the group consisting of phenyl, chlorophenyl, dichlorophenyl, dimethylphenyl, methoxyphenyl and benzyl, and the other $R_1$ is hydrogen,
$R_2$ is a member selected from the group consisting of hydrogen, lower alkyl and lower alkenyl, with the proviso that at least one radical $R_2$ is hydrogen and the heterocycle contains one quaternary carbon atom.
2. 1-amino-3-phenyl-3-ethyl-piperidine-2,6-dione.
3. 1-amino-3-phenyl-3-methyl-piperidine-2,6-dione.
4. 1-amino-3-phenyl-3-n-butyl-piperidine-2,6-dione.

No references cited.